United States Patent [19]
Evans

[11] Patent Number: 5,109,648
[45] Date of Patent: May 5, 1992

[54] PACKAGING DEVICE WITH LOOP ATTACHMENT MECHANISM AND SKIN BRAKE

[75] Inventor: Alfred J. Evans, Raleigh, N.C.

[73] Assignee: Delaware Capital Formation, Inc., Apex, N.C.

[21] Appl. No.: 507,381

[22] Filed: Apr. 10, 1990

Related U.S. Application Data

[63] Continuation of Ser. No. 354,300, May 19, 1989, abandoned.

[51] Int. Cl.⁵ .......................... B65B 9/12; B65B 61/14
[52] U.S. Cl. ................................. 53/134.1; 53/138.2; 53/567; 452/48
[58] Field of Search ................. 17/1 F, 35, 42, 49; 53/138 A, 567, 134, 413, 417, 134.1, 138.4, 138.3, 138.2; 452/30, 35, 46, 48

[56] References Cited

U.S. PATENT DOCUMENTS

| | | | |
|---|---|---|---|
| 3,975,795 | 8/1976 | Kupcikevicius et al. | 17/49 X |
| 4,044,450 | 8/1977 | Raudys et al. | 53/138 A X |
| 4,247,005 | 1/1981 | Buxton | 53/417 X |
| 4,430,772 | 2/1984 | Michel et al. | 53/576 X |
| 4,442,568 | 4/1984 | Petry | 53/576 X |
| 4,505,003 | 3/1985 | Becker et al. | 53/576 X |
| 4,516,387 | 5/1985 | Kupcikevicius | 53/576 X |
| 4,646,386 | 3/1987 | Dreisin | 17/35 X |
| 4,675,945 | 6/1987 | Evans et al. | 53/138 A X |
| 4,766,713 | 8/1988 | Evans | 53/138 A |
| 4,847,953 | 7/1989 | Evans et al. | 17/35 |

FOREIGN PATENT DOCUMENTS 1184267 12/1964 Fed. Rep. of Germany ........ 53/134

*Primary Examiner*—John Sipos
*Assistant Examiner*—Linda B. Johnson
*Attorney, Agent, or Firm*—Allegretti & Witcoff, Ltd.

[57] ABSTRACT

The apparatus includes a loop attachment device and a casing brake and horn having portions moveable relative to each other for a stuffing position and a clipping position. In the clipping position, a reduced tension is applied and the loop is attached with the clip.

2 Claims, 3 Drawing Sheets

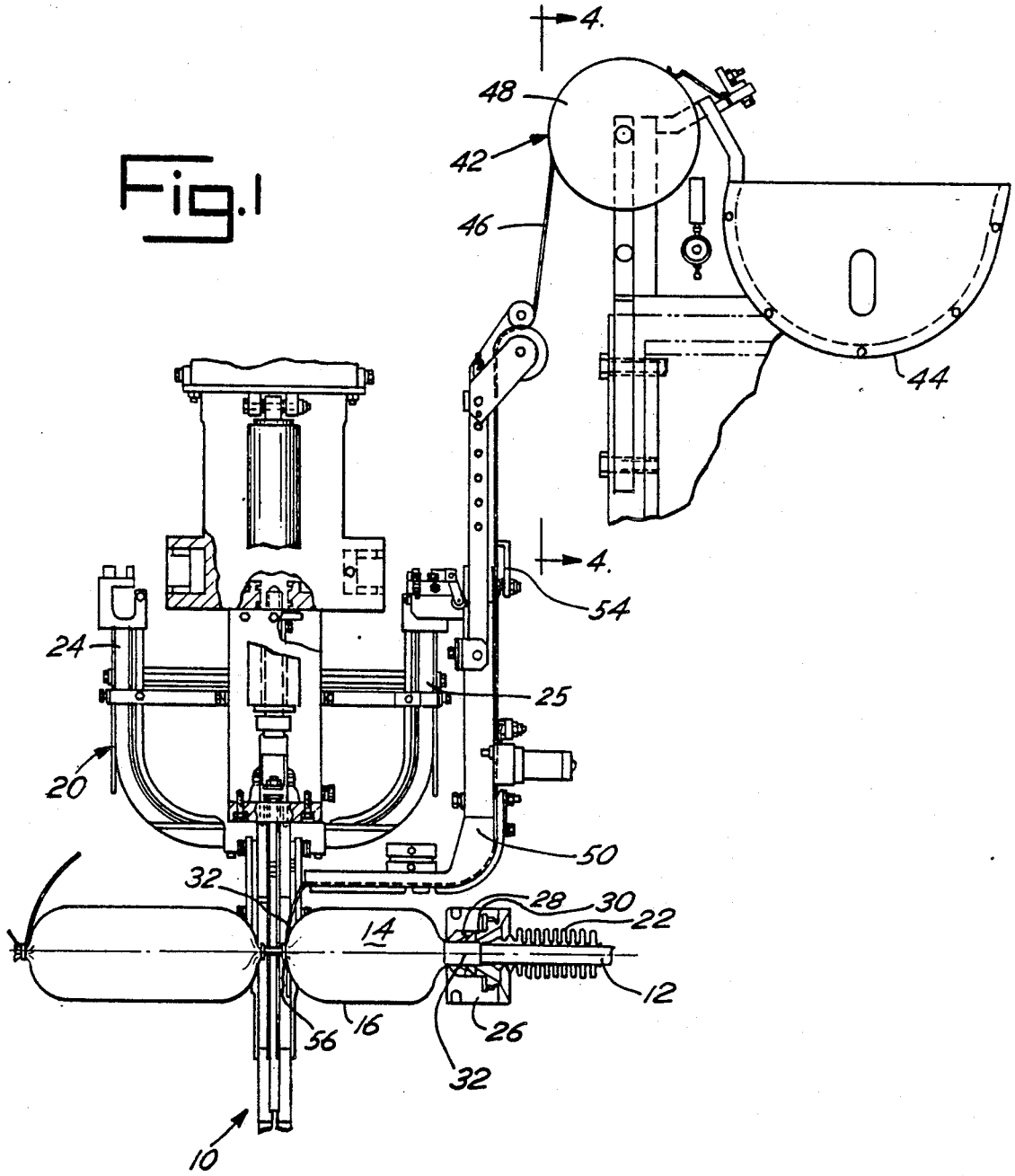

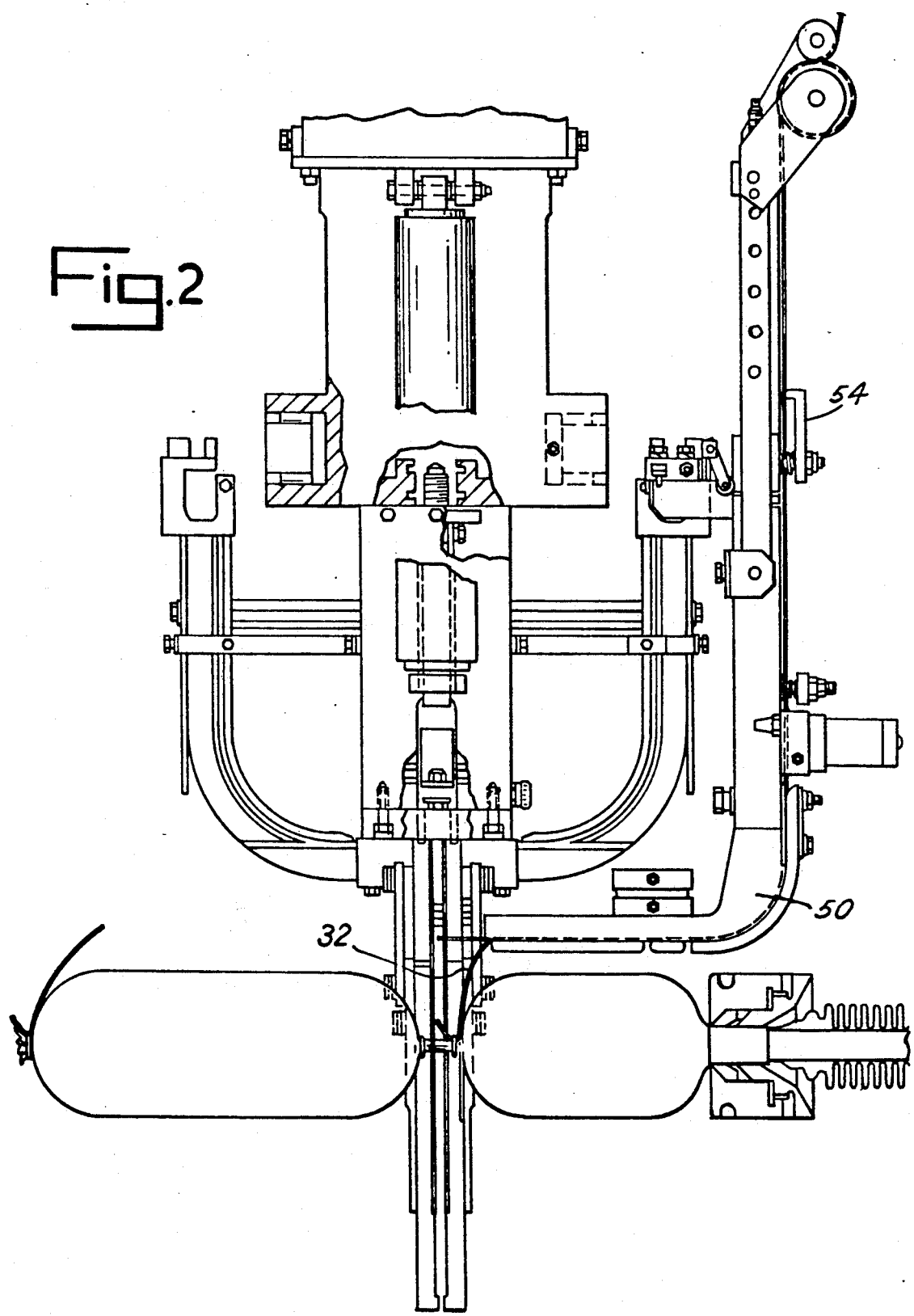

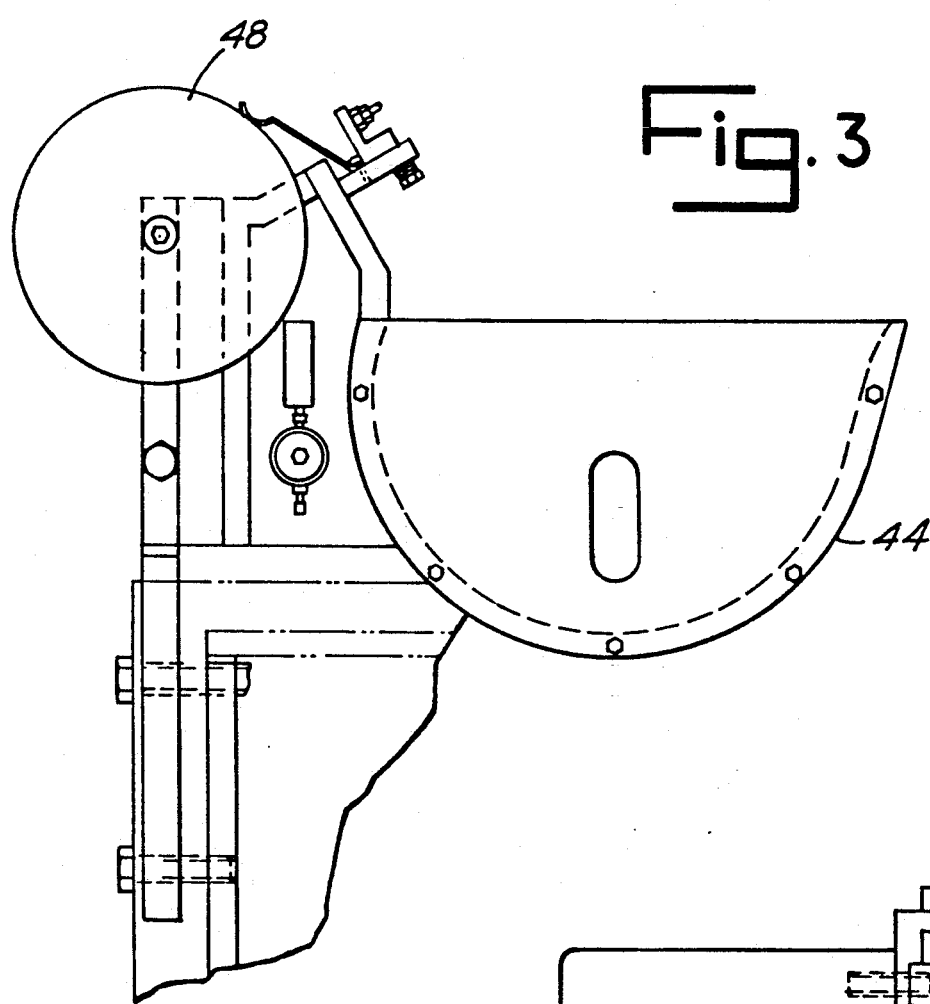
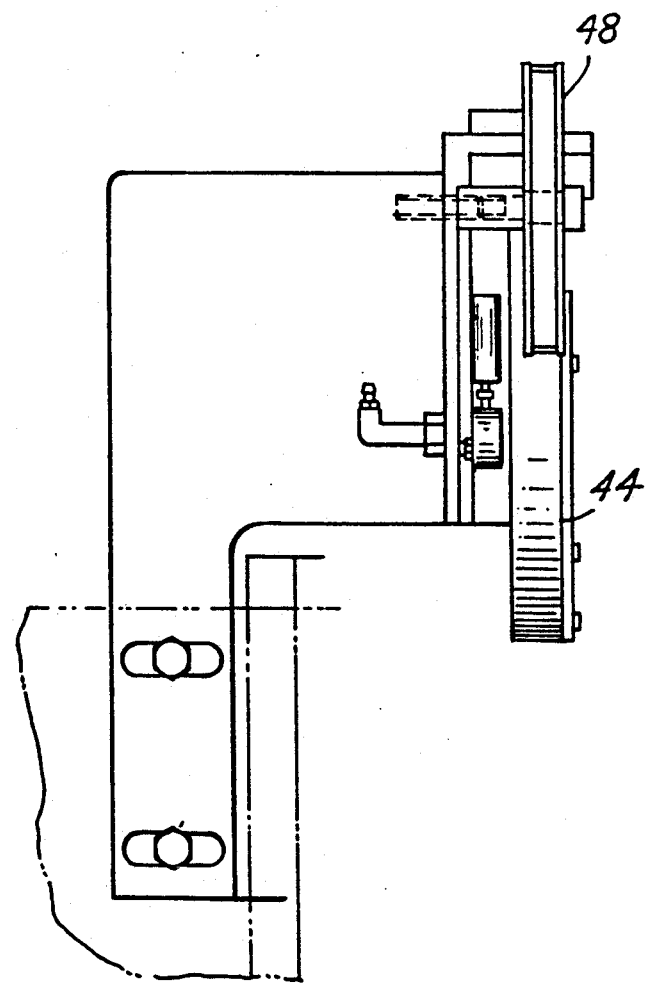

PACKAGING DEVICE WITH LOOP ATTACHMENT MECHANISM AND SKIN BRAKE

This is a continuation of application Ser. No. 07/354,300, filed May 19, 1989, now abandoned.

BACKGROUND OF THE INVENTION

This invention relates to food processing machinery, and more particularly packaging machines such as stuffing machines of the type which make sausages and similar stuffed meat and stuffed food products. Most particularly, this invention relates to a stuffing machine incorporating a looper assembly.

Sausage making and the making of similar stuffed meat and food products have become highly automated. As a result of significant, valuable research in the United States, a variety of machines have been successfully developed for the automated and semi-automated production of stuffed sausages, meats, and foods. One such machine is disclosed in U.S. Pat. No. 4,766,713, issued on Aug. 30, 1988 to Alfred J. Evans, for a Packaging Device Including Dual Clip Attachment Apparatus, incorporated by reference. In a machine such as that disclosed in the identified patent, sausage material is pumped from a vat to a stuffing horn assembly. Shirred casing is applied over the end of a stuffing horn. The casing and material pumped to the horn leave the horn simultaneously, through a casing brake. The stuffing material fills the casing and the casing maintains the material under slight pressure. The casing brake permits the casing to exit under uniform tension. Adjacent the casing brake, dual product clippers intermittently acts to void the casing past the brake and clip the stuffed casing, to define the end of an exiting product and the beginning of the next product. A looper mechanism downstream of the clippers feeds hanging loops to the downstream clipper, where the loops are attached under the downstream clips.

Other notable machines are disclosed in U.S. Pat. No. 4,675,945 issued on Jun. 30, 1987 to Alfred Evans et al., U.S. Pat. No. 4,847,953 issued Jul. 18, 1989 and U.S. patent application Ser. No. 07/352,885 filed May 17, 1989 in the names of Alfred J. Evans and R. Clay Dunigan entitled Improved Semi-Automatic Stuffing Machine, Casing Brake and Turret Assembly, all incorporated by reference. In the machines of the identified patent and applications, mechanisms are provided for movement of the casing brake, to intermittently relieve tension on the casing during clipping of product.

While the machine of U.S. Pat. No. 4,766,713 has proven highly desirable, some users of the machine have desired to fill casings in excess of recommended diameters. To date, no machines have been able to accomplish such overstuffing without cutting of the product casing under the loops.

SUMMARY OF THE INVENTION

In a principal aspect, the present invention proceeds with a discovery that overstuffing causes overstress of casing during voiding. The overstress leads to cutting of the product casing under the loops. Based on this discovery, the invention comprises an improved stuffing machine of the type including a frame, a product discharge horn, means for maintaining casing on the outside of the horn for withdrawal therefrom, brake means supported on the frame for controlling casing withdrawal from the horn, and clip attachment means including dual, upstream and downstream clippers supported by the frame for fastening dual clips about the casing withdrawn from the horn. The dual clips include upstream clips and downstream clips. In such a machine, a looper assembly means is supported on the frame upstream of the clip attachment means for feeding hanging loops to the upstream clipper for attachment to the casing withdrawn from the horn with the upstream clip.

The invention further comprises the casing brake mechanism and horn having specialized portions mounted on the machine for movement relative to each other to and from a stuffing position of the casing brake means and the stuffing horn and to and from a clipping position of the casing brake means and the stuffing horn. In the stuffing position, a stuffing-level tension is applied to the casing. In the clipping position, a reduced tension is applied.

These and other principal aspects the invention are more full appreciated by a reading of the detailed description of the preferred embodiment of the invention, which follows.

BRIEF DESCRIPTION OF THE DRAWING

The accompanying drawing illustrates the preferred embodiment of the invention, and the machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

For orientation of the reader to the drawing, and for ease of beginning of reading of the following description, a brief description of the drawing is as follows:

FIG. 1 is a side elevation depicting the looper assembly, clipper assembly, casing brake, and a portion of the horn of the preferred stuffing machine, with product shown during clipping;

FIG. 2 is a larger, side elevation view as in FIG. 1;

FIG. 3 is a detail, side elevation of the loop feed mechanism of the looper assembly; and FIG. 4 is an end elevation view of the mechanism of FIG. 3, taken from the left in FIG. 3.

The description which follows refers to the componentry of the machine in such spatial terms as "upper", "lower" "right", etc. Terms such as these, which depend of the specific spatial orientation of the components, are intended for the aid of the reader, and except as incorporated into the claims, not as a limitation on the possible orientation of components in any possible alternate, but covered, embodiment of the invention.

DETAILED DESCRIPTION OF THE PREFERRED EMBODIMENT

Referring to FIG. 1, the preferred form of the invention is embodied in a stuffing machine generally designated 10 and shown in a clipping condition. The machine 10 includes a stainless steel stuffing horn 12. Comminuted material to be cased enters the machine from the right in FIG. 1, under pressure of a pump (not shown and not a part of the invention). The material, as shown at 14, exits the stuffing horn, as casing 22 stored on the horn exits a casing brake mechanism 26, forming a cased product 16. A clipping mechanism 20 intermittently voids the stuffed casing and clips the voided casing to form ends of discharged products and beginnings of next products. Clips are fed to the clipping mechanism along clip rails 24, 25 from atop the machine. Hinged translucent guards protect the machine operator and increase sanitation. All the foregoing is mounted atop a base or frame, atop wheels.

The machine 10 is semi-automatic. The machine relies upon casing loading by the operator. Once loading is complete the operator places controls in an automatic mode and initiates a cycle start function. This action starts the system on an automatic mode in which all movements are controlled automatically by electro/pneumatic control devices. Product size is controlled by either portion control contained within the filler (not shown; not a part of the invention) or length measurements via trip paddles.

A mechanism such as in U.S. Pat. No. 4,675,945 (FIGS. 10 and 11 thereof) or the above-identified patent applications reciprocates the casing brake mechanism 26 forward and rearward a short distance. In the forward position, the casing brake mechanism is in a stuffing position. In the rearward position, the casing brake mechanism is in a clipping position.

The casing brake mechanism 26 includes two annular casing brakes 28, 30. The two casing brakes 28, 30 define two portions of the casing brake mechanism. A first of the casing brakes, brake 28, is forward or downstream (product flow defining the stream) of the second brake, brake 30. As most preferred, the brakes 28, 30 are identical. An adjusting annular fitting applies a compressive force to the rear face of casing brake 30 which in turn applies a force to an annular fitting which in turn applies a compressive force to the rear face of casing brake 28. This action adjustably tightens the brakes 28, 30 and varies the tensions of the casing on the horn. As with a conventional singular casing brake, each casing brake 28, 30 tensions the casing shirred on a horn as it exits the horn through the brake. In the case of the two brakes 28, 30, each brake contributes to the required tension while the brake mechanism 26 is in the stuffing position.

In contrast, in the clipping position of the brake mechanism 26, only one brake provides tension to the shirred casing. The first portion 32 of the stuffing horn protrudes into the casing brake mechanism into operative association with both the first casing brake and the second casing brake when the casing brake mechanism and stuffing horn are in the stuffing position. The first segment protrudes into the casing brake mechanism into operative association with only one casing brake when the mechanism and horn are in the clipping position. As a result of the configuration of the horn and brakes, a full braking is applied to the shirred casing for stuffing, and a partial braking is applied for clipping.

A looper assembly 40 includes a loop feed mechanism 42 having a loop supply tray 44 from which loops joined end-to-end as at 46 are fed. After progressing over feed rollers such as roller 48, the loops are fed along a guide rail assembly 50 to an exit 52 adjacent the upstream clipper. An exiting loop is shown at 52. A ratcheting mechanism 54 intermittently catches joined loops 46 to cause their advance. As the upstream clipper acts to apply upstream clips such as clip 56, the loop 52 is captured by the clip and clipped to the exiting product 16 under the clip 56.

In combination, the reduced tension provided during clipping and especially the upstream location of the looper assembly 40 provide non-cutting attachment of the loops.

What is claimed is:

1. An improved stuffing machine for stuffing comminuted material in casing comprising:
   a frame;
   a product discharge horn mounted to the frame, for maintaining casing on the outside of the horn for withdrawal therefrom, the horn defining an axis, the comminuted material flowing through the horn along the axis, the direction of flow defining a downstream direction, an upstream direction being opposite thereto,;
   brake means supported on the frame to selectively increase and decrease casing tension to control casing withdrawal from the horn,;
   clip attachment means including dual, upstream and downstream clippers supported by the frame for fastening dual clips about the casing withdrawn from the horn, the clippers being upstream and downstream relative to each other;
   the dual clips including upstream and downstream clips; and a looper assembly means supported on the frame upstream of the clip attachment means for feeding hanging loops to the upstream clipper attachment for attachment to the casing withdrawn from the horn while the casing tension is being reduced by the brake means with the upstream clip.

2. A stuffing machine as in claim 1 further comprising the brake means and horn having specialized portions mounted on the machine for movement relative to each other to and from a stuffing position of the casing brake means and the stuffing horn and to and from a clipping position of the casing brake means and the stuffing horn, whereby in the stuffing position, a stuffing-level tension is applied to the casing and in the clipping position, a reduced tension is applied.

* * * * *